(12) United States Patent
Wakatsuki

(10) Patent No.: US 6,792,450 B1
(45) Date of Patent: Sep. 14, 2004

(54) INFORMATION PROVIDING METHOD AND COMMUNICATION TERMINAL APPARATUS

(75) Inventor: Ryoji Wakatsuki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/288,977

(22) Filed: Apr. 9, 1999

(30) Foreign Application Priority Data

Apr. 15, 1998 (JP) .......................................... P10-104951

(51) Int. Cl.$^7$ ............................................. G06F 15/16
(52) U.S. Cl. ...................... 709/217; 709/200; 709/225; 713/323; 345/473
(58) Field of Search ................................. 709/200, 201, 709/204, 217, 225; 345/473; 713/323

(56) References Cited

U.S. PATENT DOCUMENTS

| | | | | |
|---|---|---|---|---|
| 5,680,535 A | * | 10/1997 | Harbin et al. | 345/473 |
| 5,738,527 A | * | 4/1998 | Lundberg | 434/322 |
| 5,819,284 A | * | 10/1998 | Farber et al. | 709/203 |
| 5,870,683 A | * | 2/1999 | Wells et al. | 455/566 |
| 6,049,342 A | * | 4/2000 | Nielsen et al. | 345/473 |
| 6,210,170 B1 | * | 4/2001 | Sorensen et al. | 434/323 |
| 6,256,008 B1 | * | 7/2001 | Sparks et al. | 345/618 |
| 6,288,715 B1 | * | 9/2001 | Bain et al. | 345/211 |
| 6,401,209 B1 | * | 6/2002 | Klein | 713/200 |

* cited by examiner

*Primary Examiner*—Saleh Najjar
(74) *Attorney, Agent, or Firm*—Jay H. Maioli

(57) ABSTRACT

Data composed of a plurality of still pictures is stored in a center (1) connected to a predetermined communication line. Under the condition that a communication terminal apparatus (10) and the center (1) are connected by a communication line, the data composed of a plurality of still pictures accumulated in the center (1) is downloaded into a memory housed in the communication terminal apparatus (10) in response to a request from the communication terminal apparatus (10). After the connection made by the communication line is cut off, by a predetermined operation of the communication terminal apparatus (10), a plurality of still pictures are displayed one by one on a display unit of the communication terminal apparatus (10) in a predetermined order based on data stored in the memory.

4 Claims, 6 Drawing Sheets

*FIG. 5A*

```
1  Comic A  (   )
2  Comic B  (   )
3  Comic C  (   )
4  Comic D  (   )
5  Comic E  (   )
```

*FIG. 5B*

```
1  Comic A  (   )
2  Comic B  ( ● )
3  Comic C  (   )
4  Comic D  ( ● )
5  Comic E  (   )
```

*FIG. 5C*

```
1  Comic A  (   )
2  Comic B  ( ● )
3  Comic C  (   )
4  Comic D  ( ● )
5  Comic E  (   )
```
Downloading

INFORMATION PROVIDING METHOD AND COMMUNICATION TERMINAL APPARATUS

BACKGROUND OF THE INVENTION

1. Field of the Invention

The present invention relates to an information providing method for use with an apparatus for providing information via a radio telephone line, for example, and a communication terminal apparatus for processing the information provided by this information providing method.

2. Description of the Related Art

Heretofore, there have been made available a variety of mobile communication systems using a communication terminal apparatus. For example, a communication terminal apparatus capable of communicating with a communication base station side prepared as a radio telephone system by radio waves is prepared and an outgoing call is made from this communication terminal apparatus or an incoming call is received at the communication terminal apparatus, whereby a user can communicate with an arbitrary called person connected to the communication terminal apparatus via the base station. Further, there has been developed a terminal apparatus which becomes able to exchange character messages between it and the called person by transmitting and receiving character data coded by a predetermined system other than communication based on audio data.

It is customary that general users may make a telephone communication for several minutes to several 10s of minutes in a day, for example, and a standby time in which a user is not in communication is rather long. In this case, however, in order to receive an incoming call from the base station side, the user constantly places the terminal apparatus in the standby mode so as to receive an incoming call even when the terminal apparatus is not in communication.

Accordingly, the user should constantly carry the communication terminal apparatus when the communication terminal apparatus is not in use. In this case, when the communication terminal apparatus is not in use as the telephone set, such communication terminal apparatus is useless.

To solve the aforementioned problem, there have heretofore been developed a variety of multi-function communication terminal apparatus. For example, there have been developed a variety of multi-function communication terminal apparatus in which a function of a portable information management apparatus called a PDA (personal digital assistants) is assembled into a portable telephone thereby to manage a schedule and to transmit and receive electronic mails after the portable information manage apparatus was connected to a predetermined data communication network such as an internet or the like.

In this conventional multi-function communication terminal apparatus, its operation for executing other processing than the communication is comparatively complex. Also, the conventional multi-function communication terminal apparatus includes a display portion of large-size so that the shape of the terminal apparatus becomes relatively large.

SUMMARY OF THE INVENTION

Therefore, it is an object of the present invention to provide a communication terminal apparatus which can be effectively utilized in other purposes than a communication and its method.

According to an aspect of the present invention, there is provided an information providing method which is comprised of the steps of accumulating data composed of a plurality of still pictures relating to each other in a center connected to a predetermined communication line, downloading data composed a plurality of still pictures accumulated in the center to a memory housed in a communication terminal apparatus in response to a request from the communication terminal apparatus under the condition that the communication terminal apparatus and the center are connected by a communication line and displaying a plurality of still pictures stored in the memory one by one on a display unit of the communication terminal apparatus in a predetermined order according to a predetermined operation of the communication terminal apparatus after the connection made by the communication line is disconnected.

In accordance with another aspect of the present invention, there is provided a communication terminal apparatus which is comprised of a reception unit for receiving a signal transmitted from a predetermined communication base station, a transmission unit for transmitting a signal to the communication base station, a memory for memorizing a plurality of still picture data received at the reception unit, a display unit for displaying a still picture based on data memorized in the memory, an operation unit for instructing switching of a display of a still picture on the display unit and a control unit for changing still pictures displayed on the display unit one by one in the order set in the still pictures based on the operation of the operation unit.

According to the information providing method of the present invention and the communication terminal apparatus of the present invention to which this information providing method is applied, a plurality of still pictures based on data downloaded onto the communication terminal apparatus can be sequentially displayed by operating its terminal apparatus.

BRIEF DESCRIPTION OF THE DRAWINGS

FIGS. 5A to 5C are pictorial representations used to explain the manner in which electronic comic data is displayed in a download mode, respectively;

DESCRIPTION OF THE PREFERRED EMBODIMENTS

An information providing method and a communication terminal apparatus according to an embodiment of the present invention will hereinafter be described with reference to the drawings.

Figure 1:
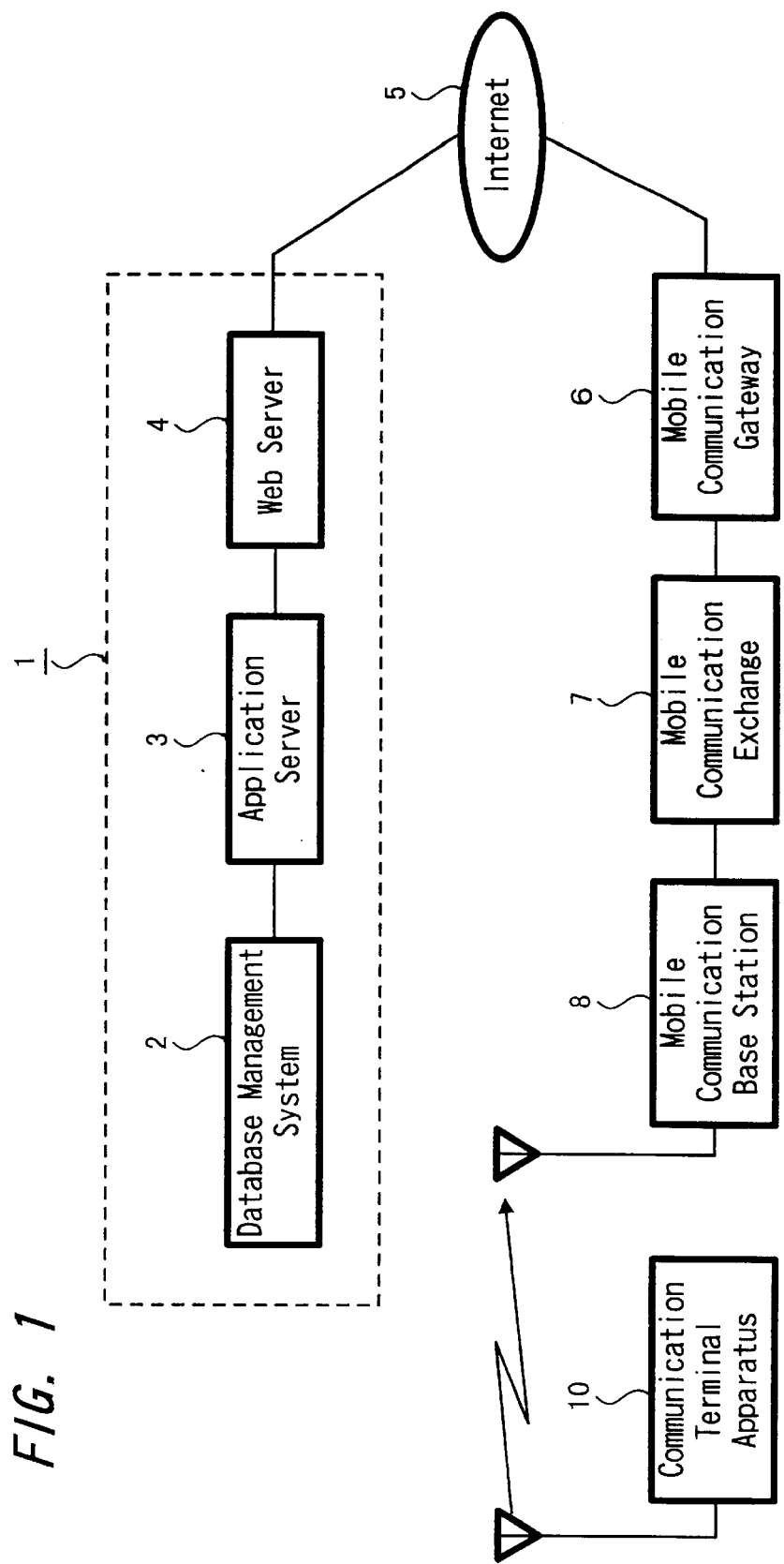
FIG. 1 is a block diagram showing an example of a communication system according to an embodiment of the present invention.

FIG. 1 of the accompanying drawings is a block diagram showing an overall arrangement of a communication system according to an embodiment of the present invention. In this embodiment, as shown in FIG. 1, there is prepared an electronic comic server 1. As shown in FIG. 1, this electronic comic server 1 is connected to an internet 5, and comprised of a database management system 2 for retrieving electronic comic data prepared by data transmitted through the internet 5, an application server 3 managed by this management system 2 to read out electronic comic data from a predetermined medium and a web server 4 for transmitting the electronic comic data read out by the application server 3 to the internet 5 under control of the management system 3. In this case, the web server 4 transmits electronic comic data to the internet 5 according to a predetermined protocol such as a HTTP (hyper text transfer protocol) or the like. The internet 5 interchanges data from a server by using a suitable means such as a private network, a public network or the like according to a protocol such as a TCP/IP (transmission control protocol/internet protocol) and the like.

Electronic comic data stored in this electronic comic server 1 is data in which comics (story comics) comprising a plurality of still pictures (e.g. approximately 100 still pictures) are stored as still picture data composed of bit map data one by one. In this case, data corresponding to data of pages indicating the displayed order are given to still pictures comprising electronic comic data of respective kinds (volumes), Then, the electronic comic server 1 transmits electronic comic data of a requested kind in response to a user's request supplied thereto through the internet 5 to the internet 5 side. In this case, new comic data is added to the electronic comic data stored in the electronic comic server 1 at every predetermined period (e.g. one week) or the electronic comic data stored in the electronic comic server 1 is replaced with new comic data.

In this embodiment, as a means capable of accessing the electronic comic server 1 via the internet 5, there is used a communication terminal apparatus 10 which might be called a portable telephone or the like. This communication terminal apparatus 10 sets a radio telephone line by a radio communication with a mobile communication base station 8 located under a predetermined state and becomes able to communicate with an arbitrary person through a mobile communication exchange 7. When an outgoing call of a previously-set specified telephone number is made from this communication terminal apparatus 10, the communication terminal apparatus 10 is connected to the internet 5 from the mobile communication exchange 7 through a mobile communication gateway 6 and connected to the electronic server 1 in a dial-up fashion.

While the communication terminal apparatus 10 accesses the electronic comic server 1 through the internet 5 as described above, the present invention is not limited thereto, and the electronic comic server 1 may be prepared at an arbitrary position of the telephone line side within the mobile communication gateway 6 and the communication terminal apparatus 10 may be directly connected to the electronic comic serer 1 by the dial-up-connection to the mobile communication gateway 6 or the like based on the telephone line.

When data is transmitted between the communication terminal apparatus 10 and the mobile communication gateway 6, there is used a data transmission protocol that is prepared by that mobile communication system. In the case of the communication terminal apparatus 10 for a mobile communication system called a personal handy phone system (PHS), there is used a protocol called a PIAFS (PHS internet access forum standard) capable of transferring data at a relatively high speed (32 kbps). If necessary, the mobile communication gateway 6 executes a protocol conversion processing.

Figure 2:
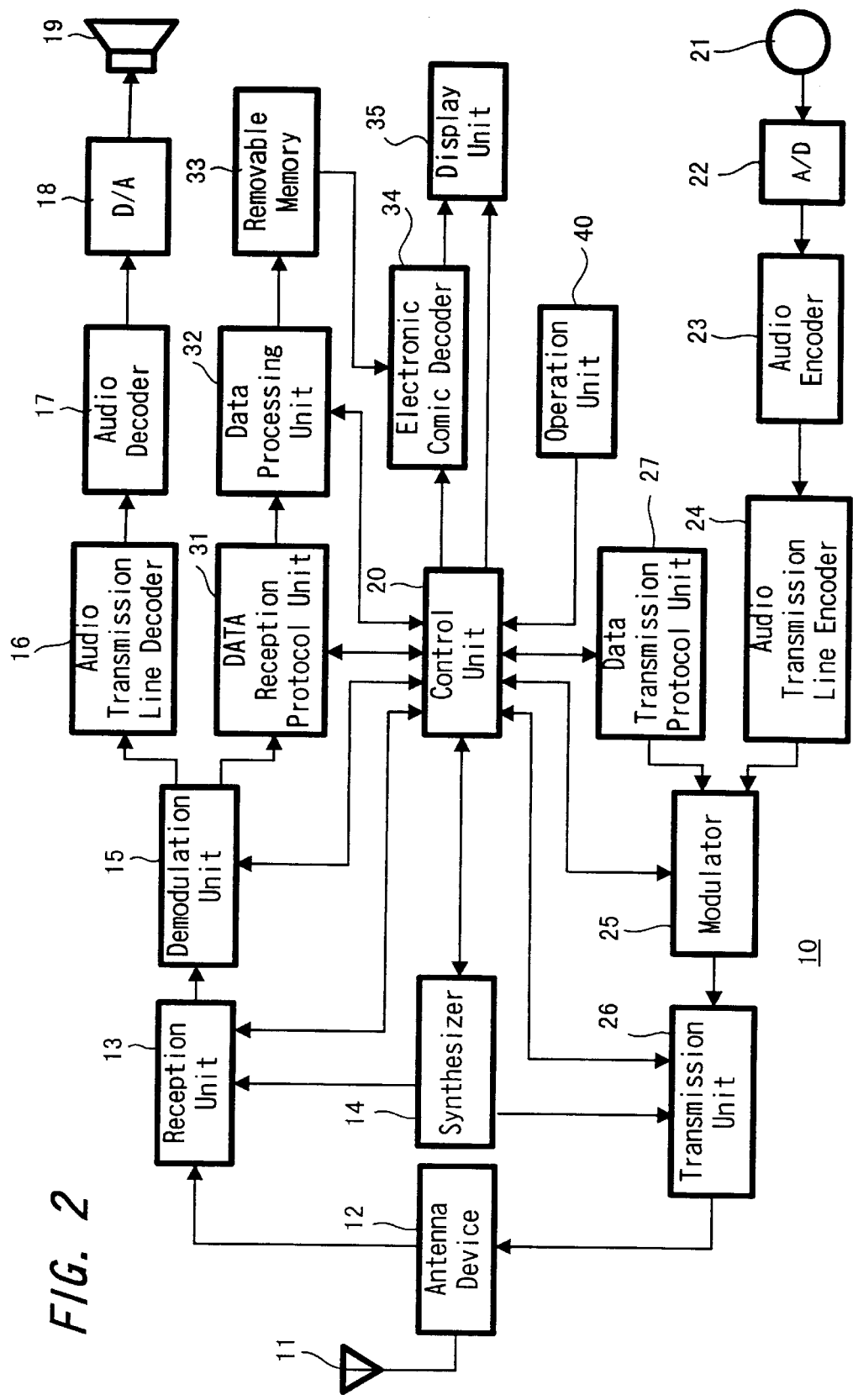
FIG. 2 is a block diagram showing an example of a communication terminal apparatus according to an embodiment of the present invention.

An arrangement of the communication terminal apparatus 10 will be described with reference to FIG. 2. As shown in FIG. 2, in the communication terminal apparatus 10, an antenna shared 11 is connected through an antenna shared device 12 to a reception unit 13. This reception unit 13 receives a frequency based on an oscillation signal supplied from a synthesizer 14, and supplies its reception signal to a demodulator 15. The demodulator 15 implements the demodulation processing conforming to a transmission system applied to this radio telephone system. The demodulator 15 supplies audio data contained in the demodulated signal to an audio transmission line decoder 16, in which the audio data encoded for transmission line is decoded. The data thus decoded is supplied to an audio decoder 17, in which it is decoded to provide audio data of a predetermined system. Then, the audio data decoded by the audio decoder 17 is supplied to a digital-to-analog (D/A) converter 18, in which it is converted into an analog audio signal. The audio signal thus converted is supplied to a speaker 19, from which it is emanated.

Also, an audio signal picked up by a microphone 21 attached to this communication terminal apparatus 10 is supplied to an analog-to-digital (A/D) converter 22, in which it is converted into digital audio data. This audio data is supplied to an audio encoder 23, in which it is encoded to provide predetermined bit-compressed audio data. The data thus encoded is supplied to an audio transmission line encoder 24, in which it is encoded to provide transmission line data. The data thus encoded is supplied to and modulated by a modulator 25. Then, the modulated signal is supplied to a transmission unit 26 and thereby frequency-converted into a frequency based on an oscillation output from a synthesizer 14. The transmission signal thus frequency-converted is supplied through the antenna shared device 12 to the antenna 11, from which it is transmitted by radio waves.

The reception processing and the transmission processing of audio data are executed under control of a control unit 20 which is a system controller of this communication terminal apparatus 10. As described above, audio data is transmitted and received in the processing of the telephone mode which is the communication mode.

The communication terminal apparatus 10 prepares operation modes of the download mode and the electronic comic mode as other modes than this telephone mode. When the communication terminal apparatus 10 is placed in the download mode, the communication terminal apparatus 10 receives and accumulates electronic comic data. To this end, the communication terminal apparatus 10 includes a data reception protocol unit 31 to which data demodulated by the demodulator 15 is supplied, a data processing unit 32 which processes electronic comic data or the like supplied from this data reception protocol unit 31 based on the transmission protocol and a removable memory 33 for storing data obtained at this data processing unit 32. The memory 33 is not limited to a removable memory but may be a fixed memory. Then, when the electronic comic data thus received is supplied through the data reception protocol unit 31 to the data processing unit 32, such electronic comic data is memorized in the memory 33.

Further, in order to transmit data instructing the download of electronic comic data or the like under control of the control unit 20, a data transmission protocol unit 27 is connected to the control unit 20. Each protocol data generated by this data transmission protocol unit 27 is supplied to and modulated for transmission by the modulator 25 and frequency-converted by the transmission unit 26, thereby resulting in the signal thus frequency-converted being transmitted from the antenna 11 by radio waves. Incidentally, the data reception protocol unit 31 and the data transmission protocol unit 27 may also be served as a protocol unit that the terminal apparatus includes for communicating a variety of data.

When the communication terminal apparatus 10 is placed in the electronic comic mode, the electronic comic data is read out from the memory 33 under control of the control unit 20, supplied to an electronic comic decoder 34, in which it is decoded for electronic comic data. The data thus decoded is supplied to a display unit 35 and thereby still pictures comprising the electronic comic are sequentially displayed one by one thereon. Here, as the display unit 35, there is used a display unit capable of bit-map display by using a liquid-crystal display panel. Here, there is used a display panel of about dots in which 160 dots in the horizontal direction ×120 dots in the vertical direction and this display panel is able to display an image having gradations of a predetermined number, e.g. approximately 8 gradations. A size of this display unit 35 is selected in such a manner that the communication terminal apparatus 10 serving as the portable telephone may be disposed without increasing its size to much (e.g. width of about several centimeters both in the horizontal and vertical directions). This display unit 35 might be slightly larger than a display panel for use with a conventional portable telephone to display telephone numbers, character messages and so on. Incidentally, the display unit 35 may display not only still pictures for electronic comic but also a variety of displays such as telephone numbers, character messages and so on that can be displayed by an ordinary radio telephone under control of the control unit 20. Also, the display panel of the display unit may include an illumination means such as a back-light or the like.

When still pictures of electronic comic are displayed in this electronic comic mode, the still pictures are sequentially displayed from the first page under control of the control unit 20 based on data of pages given to data of still pictures comprising the electronic comic data. By operating an operation unit 40 prepared for this communication terminal 10 in a predetermined manner, still pictures being displayed are sequentially changed page by page under control of the control unit 20. Alternatively, when the display of electronic comic is interrupted after a page in somewhere of electronic comic was displayed, data of the interrupted page is stored in the memory within the control unit 20 so that, if the communication terminal apparatus 10 is set in the electronic comic mode again, then the display is resumed from the page of the stored page.

Incidentally, the operation unit 40 prepared for the communication terminal apparatus 10 includes not only the keyboard unit in which a dial key and a mode switching key and the like are disposed but also a rotary switch unit called a jog-dial that can be both rotated and depressed. Each operation information is supplied to the control unit 20.

Figure 3:
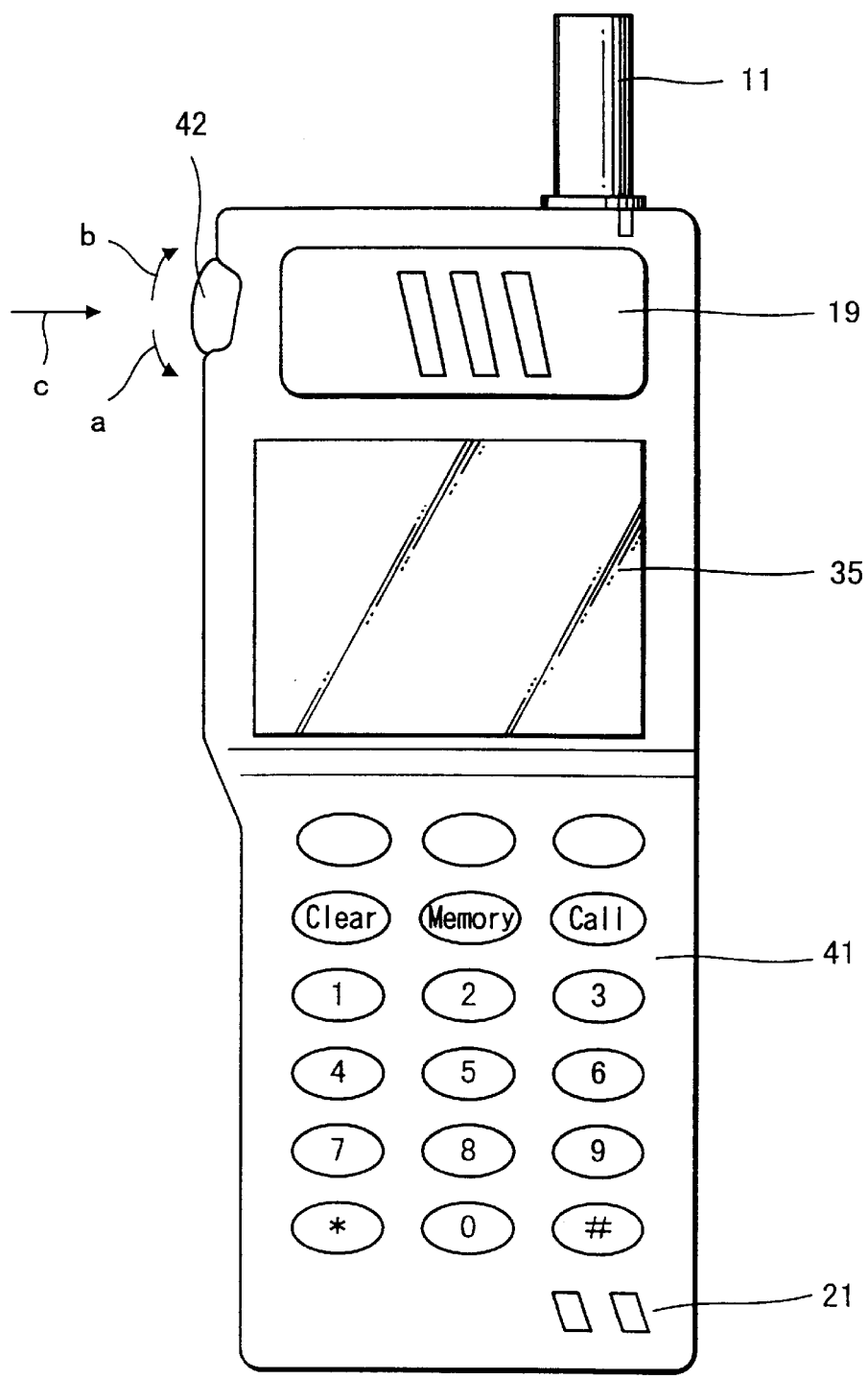
FIG. 3 is a plan view showing an example of an outward appearance of a communication terminal apparatus according to an embodiment of the present invention.

Specifically, FIG. 3 shows an example of an outward appearance of the communication terminal apparatus 10 according to this embodiment. As shown in FIG. 3, the antenna 11 is attached to the upper end of an oblong housing, the communication speaker 19 is disposed above the front surface portion, and the communication microphone 21 is disposed at the lower side of the front surface portion. Then, a key panel unit 41 is disposed at the under side between the speaker 19 and the microphone 21. A dial key, a mode setting key and other keys are disposed on the key panel portion 41. Also, the key panel portion 41 includes on its upper portion disposed a display panel comprising the display unit 35. In the telephone mode, telephone numbers, reception levels and the like are displayed on the display panel. Also, in the electronic comic mode, a bit-map image having a predetermined gradation is displayed on the display panel.

A rotary switch portion 42 is disposed on the upper portion of the side surface of the housing. This rotary switch portion 42 may be rotated in the direction (lower side) shown by an arrow a, rotated in the direction (upper side) shown by an arrow b, and depressed in the rotary shaft direction shown by an arrow c. When the rotary switch portion 42 is operated in each direction, each operation information is supplied to the control unit 20. In this embodiment, the mode of this apparatus is set by depressing the rotary switch portion 42. When the electronic comic mode is set in such mode setting and a still picture based on electronic comic data is displayed, if the control unit 20 determines that the rotary switch portion 42 is rotated, then the pages of displayed comics maybe switched sequentially. That is, when the rotary switch portion 42 is rotated in the arrow a direction, a displayed page is changed one by one in the forward direction at every rotation of a predetermined angle. When the rotary switch portion 42 is rotated in the opposite direction, i.e. the arrow b direction, a displayed page is changed one by one in the opposite direction at every rotation of a predetermined angle. However, when the rotary switch portion 42 is rotated at high speed, several displayed pages to several 10s of displayed pages maybe changed in the positive direction or the opposite direction.

Figure 4:
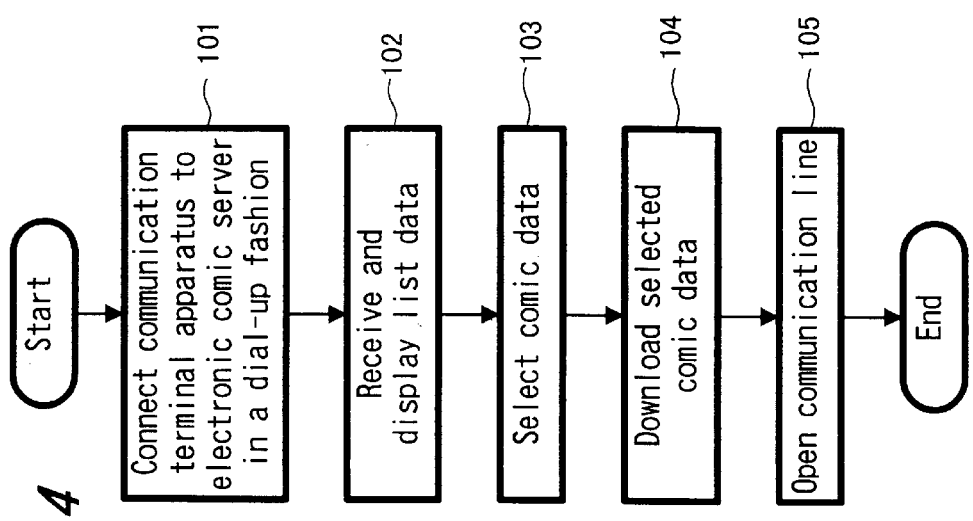
FIG. 4 is a flowchart to which reference will be made in explaining the processing executed by a terminal apparatus in the download mode.

The manner in which electronic comic data is downloaded in the download mode by using the communication terminal apparatus 10 will be described. FIG. 4 is a flowchart showing processing executed by the communication terminal apparatus 10 in the download mode.

Referring to FIG. 4, following the start of operation, when the communication apparatus 10 is set in the download mode, the communication apparatus 10 is connected to the electronic comic server 1 in a dial-up fashion (step 101). At that time, a user may operate dials of corresponding telephone numbers or when the download mode is set, an outgoing call to previously-registered telephone numbers may be made automatically.

When the communication terminal apparatus 10 is connected to the electronic comic server 1 in a dial-up fashion, list data is transmitted from the electronic comic server 1 side. The list data is received by the data reception protocol unit 31 within the communication terminal 10, and the received data is judged by the control unit 20 and thereby being displayed on the display unit 35 (step 102). At that time, when there are a large number of kinds of electronic comic data stored in the electronic comic server 1 side, list data covering several pages may be displayed on the display unit 35. Moreover, by user's operation, only list data of a designated classification may be transmitted and displayed. For example, list of data concerning new books (updated comics), lists of authors and so on may be displayed.

Then, under the condition that this list is displayed, a desired comic is selected from this list by the user' operation, and information indicative of the kind of the selected comic is transmitted to the electronic comic server 1 side (step 103). Then, the electronic comic data thus selected is downloaded from the electronic comic server 1 side to the communication terminal 10 and then stored in the memory 33 (step 104). At the completion of the download, there is executed a processing for opening a line connection (step 105).

FIGS. 5A to 5C show examples of pictures displayed on the display panel of the display unit 35 when list data is received at the communication terminal apparatus 10. In the initial state, as shown in FIG. 5A, there is displayed a list of the kinds of comics prepared on the electronic comic server 1 side. This list includes an area in which a user can check desired comics by marks. In this state, the user can select a comic being downloaded by rotating and depressing the rotary switch 42. After the user executes this selection operation, as shown in FIG. 5B, the selected comics are marked with solid circles or the like which demonstrate the desired comics. Then, when the user operates predetermined keys to initiate the download, data indicative of the download of the selected electronic comic data is transmitted to the electronic comic server 1 side, and the thus selected electronic comic data is downloaded from the electronic comic server 1 to the communication terminal apparatus 10. At that time, as shown in FIG. 5C, for example, there is displayed a message indicating "DOWNLOADING".

When one still picture, for example, is data having eight gradations comprising 160 dots×120 dots and the data is transferred at 32 kbps according to the above-mentioned PIAFS transmission protocol, electronic comic data comprising 100 still pictures, for example, can be downloaded for about 20 seconds.

Figure 6:
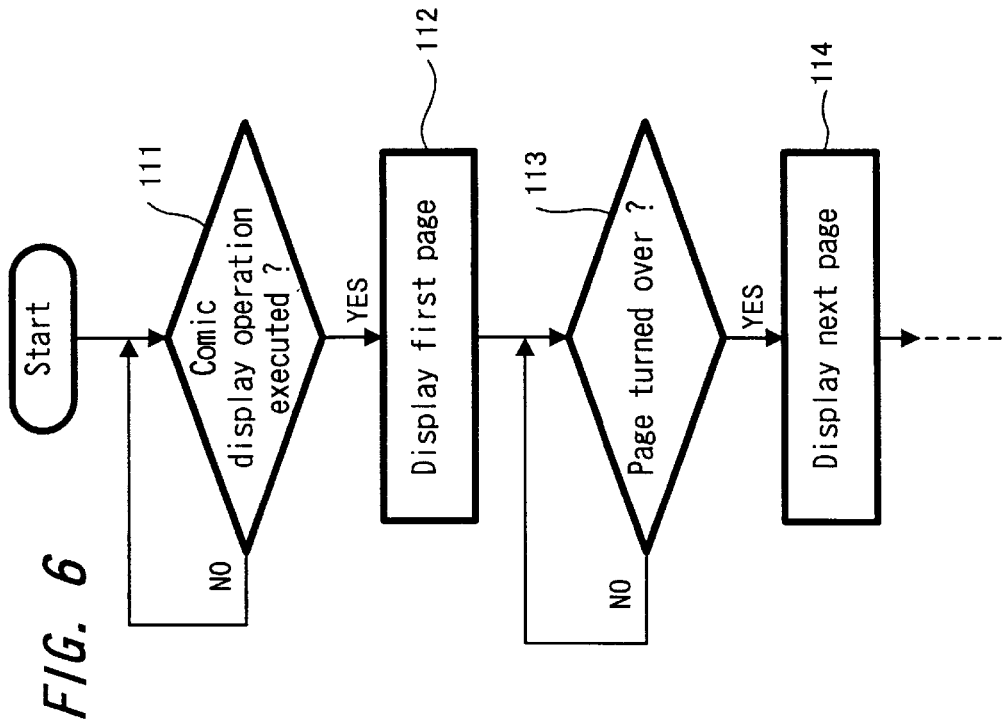
FIG. 6 is a flowchart to which reference will be made in explaining the processing executed by a terminal apparatus in the electronic comic mode.

After the download is ended as described above, when the user places the communication terminal apparatus 10 in the electronic comic mode, the user can display a desired comic whenever the user likes. FIG. 6 is a flowchart showing the state in which data is processed by the communication terminal apparatus 10 in the electronic comic mode.

Referring to FIG. 6 and following the start of operation, when the electronic comic mode is set, it is determined by the control unit 20 at a decision step 111 whether or not an operation for displaying comic data stored in the memory 33, for example, is executed by the user. If the user executes the display operation as represented by a YES at the decision step 111, the process goes to a step 112 in which a first page of electronic comic data stored in the memory 33 at that time is displayed. Incidentally, when there are a plurality of kinds (a plurality of volumes) of electronic comic data stored in the memory 33, the user may execute an operation for selecting the kind of desired electronic comic data.

Then, the process goes to the next decision step 113, whereat it is determined by the control unit 20 whether or not the user turns over the pages by operating the rotary switch portion 42 or the like. If the user turns over the pages as represented by a YES at the decision step 113, then the process goes to a step 114, whereat the next page is displayed on the display panel of the display unit 35. Incidentally, under the condition that other page than the first page is displayed, the user can turn over the pages in the opposite direction. In this manner, the user is able to display the still pictures based on the electronic comic data on the display panel of the display unit 35 page by page.

Figure 7A:
FIGS. 7A to 7C are pictorial representations used to explain the manner in which electronic comic data is displayed in the electronic comic mode.
Figure 7B:
Figure 7C:
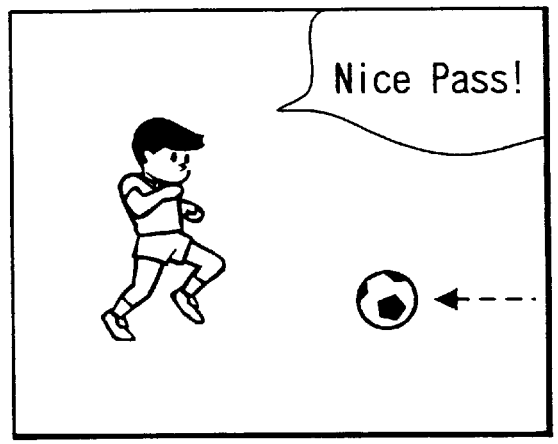

FIGS. 7A to 7C are pictorial representations showing the manner in which still pictures are displayed by using electronic comic data. As shown in FIGS. 7A to 7C, still pictures are sequentially displayed on the display panel of the display unit 35 page by page. In the still pictures of respective pages, lines may frequently be displayed by characters. In this case, characters are displayed as bit-map image data. During still pictures of electronic comic data are being displayed in the electronic comic mode, if the communication terminal apparatus 10 receives an incoming call, then the communication terminal apparatus 10 may be changed from the electronic comic mode to the telephone mode and the display of the still pictures of comics may be interrupted tempolarily under control of the control unit 20. In this case, when the communication terminal apparatus 10 is set in the electronic comic mode again, then the display of the still pictures of comics can be resumed from the interrupted page.

Further, when the displayed page is switched in the electronic comic mode, the page being displayed may automatically be switched to the next page at every predetermined time (e.g. at every several seconds) under control of the control unit 20.

Also, when the user switches the page, the user may select the next situation on the still picture being displayed such that the next displayed page may be determined in response to the selected state. Furthermore, the user may play a simple game based on the still pictures being displayed.

When data of some audio signal or acoustic signal is added to data of still pictures comprising electronic comic data accumulated in the server side, such data is simultaneously downloaded and stored in the memory 33 upon downloading, the data stored in the memory 33 is decoded by the audio signal decoders 16, 17 for effecting audio processing and the still picture is displayed in the electronic comic mode, the added audio data may be supplied to and decoded by the decoders 16, 17 and corresponding sounds may be emanated from the speaker 19. According to this arrangement, lines and sound effects may be added to the still picture when the still picture is displayed. Incidentally, with respect to specific sound effects (e.g. sounds obtained when something is hit) which may be frequently used in comics, a code indicating such sound is determined in advance, such code is added to electronic comic data, and the communication terminal apparatus side previously stores data indicating a correspondence between that code and reproduced sound. Then, when the still picture with such code added is reproduced, the corresponding sound may be emanated from the speaker so that a data amount of audio data added to the electronic comic data may be decreased.

Since the communication terminal apparatus 10 connected to the system is used as the system arrangement according to this embodiment, the communication terminal apparatus 10 can display still pictures of electronic comic data. In this case, the communication terminal apparatus 10 should make a communication with the server side in order to display electronic comic data only when electronic comic data is downloaded, e.g. approximately several 10s of seconds. Thus, the user can download the electronic comic data by a relatively inexpensive line using rate. Incidentally, when a user downloads electronic comic data, a rate concerning electronic comic data may be required independently of the line using rate. In this case, when the communication terminal apparatus 10 is connected to the electronic comic server 1 in a dial-up fashion, a user may be identified based on a telephone number given to the communication terminal apparatus 10 which makes an outgoing call, and the system may charge the user thus identified.

In the communication terminal apparatus 10 according to this embodiment, once electronic comic data is downloaded, wherever a user carries the communication terminal apparatus 10 (i.e. even when a user is outside of the service area in which this communication terminal apparatus 10 can communicate with the electronic comic server 1), the electronic comic data stored in the memory 33 can be displayed. For example, it becomes possible to display comics while a user is not in communication. In addition, a user can download electronic comic data and display the electronic comic data thus downloaded by very simple operations such as operations of the rotary switch portion 42. In particular, the rotary switch portion 42 shown in FIG. 3 is used as the operation means, whereby the operation can be made very simple.

In this embodiment, since the removable memory 33 is used as the memory for storing electronic comic data within the communication terminal apparatus 10, if electronic comic data is memorized in this removable memory 33 and the removable memory 33 is removed therefrom and attached to other terminal apparatus (terminal apparatus similar to the communication terminal apparatus 10 or terminal apparatus without communication function and which is capable of only displaying data), then it becomes possible to display electronic comics on other terminal apparatus. Moreover, the memory 33 thus removed may be connected to a suitable apparatus such as a personal computer having a memory means of a large storage capacity or the like so that electronic comic data may be transferred to and saved in the personal computer.

Further, when electronic comic data is distributed by the above-mentioned system, the electronic comic server side may execute very efficient processing as compared with the conventional case in which comics are distributed in the form of magazines and books. That is, since comics are all circulated electronically, a cost required by the circulation of comics is only a communication cost and is very inexpensive. Also, since the communication terminal apparatus 10 is able to implement the mobile communication, a user can obtain comic data wherever the user likes, thus to maintain immediateness. Also, since the server side does not use paper unlike the prior art in which comics are distributed in the form of magazines and books, the present invention is preferable from a standpoint of saving resources. Furthermore, the server side can distribute as much data as possible in response to user's requests. Thus, the user never encounters with a sellout of desired comics, and the server side (publisher) can be protected from a risk that comics remain unsold.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An information providing method for a communication terminal apparatus, the method comprising the steps of:
   accumulating data composed of sets of pluralities of still pictures each relating to each other in a server at a base station connected to a predetermined communication line;
   setting the communication terminal apparatus in a download mode;
   receiving from the server a list of sets of the pluralities of still pictures at the communication terminal apparatus and displaying the list;
   sending a set selection command to the server to select one of the plurality sets of still pictures;
   downloading data from the server at the base station of the selected set composed of the plurality of still pictures at the communication terminal apparatus over a communication line;
   supplying the received data to a data reception protocol unit housed in the communication terminal apparatus;
   processing the received data based on a predetermined transmission protocol;
   storing the processed received data of the selected set in a memory housed in the communication terminal apparatus;
   setting the communication terminal apparatus in a data display mode; and
   displaying said set of plurality of still pictures stored in said memory one by one on a display unit of said communication terminal apparatus in a predetermined order according to a predetermined operation of said communication terminal apparatus after a connection made by said communication line is cut off.

2. A communication terminal apparatus comprising:
   an operation unit for setting an operating mode of the communication terminal apparatus, including setting a telephone mode, a download mode, and a data display mode;
   a reception unit for receiving a list of sets of pluralities of still pictures stored in a server connected to a predetermined base station upon setting the operation unit in the telephone mode;
   a data transmission protocol unit for producing an instruction signal to download a selected on of said sets of still pictures from the server upon setting the operation unit in the download mode;
   a transmission unit for transmitting the instruction signal to the predetermined base station;
   a reception unit for receiving a signal including the selected set of the plurality of still pictures from the server through the predetermined base station;
   a data reception protocol unit for setting a predetermined processing protocol;
   a data processing unit for processing the received data signal according to the predetermined processing protocol;
   a memory for storing a plurality of still picture data of the selected set processed by the data processing unit;
   a display unit for displaying a still picture based on the still picture data stored in said memory and upon the operation unit setting the data display mode;
   a control unit connected to the operation unit and the display unit for changing still pictures displayed on said display unit one by one in an order set in said still pictures based on operation of said operation unit.

3. The communication terminal apparatus as claimed in claim 2, wherein said operation unit is comprised of an operation means for rotary operation in a first direction and rotary operation in a second direction opposite to said first direction, and
   wherein said control unit changes the still pictures displayed on said display unit one by one in a positive direction each time said operation means executes the first direction rotation operation of a predetermined amount and changes the still pictures one by one in the opposite direction each time said operation means executes the second direction rotation operation of a predetermined amount.

4. The communication terminal apparatus according to claim 2, further comprising an audio processing unit for outputting a predetermined audio signal or an acoustic signal based on data added to the still picture data stored in said memory.

* * * * *